UNITED STATES PATENT OFFICE.

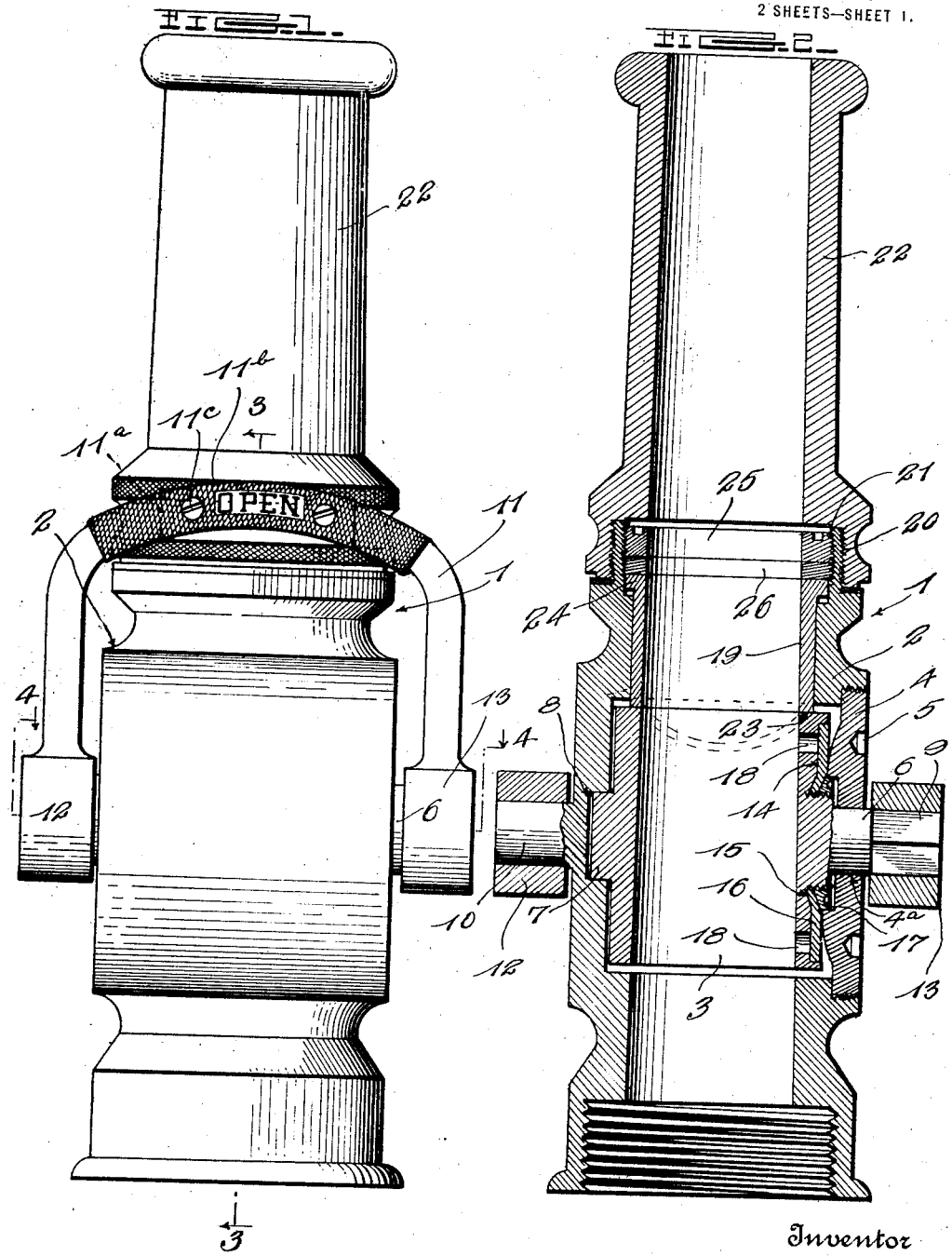

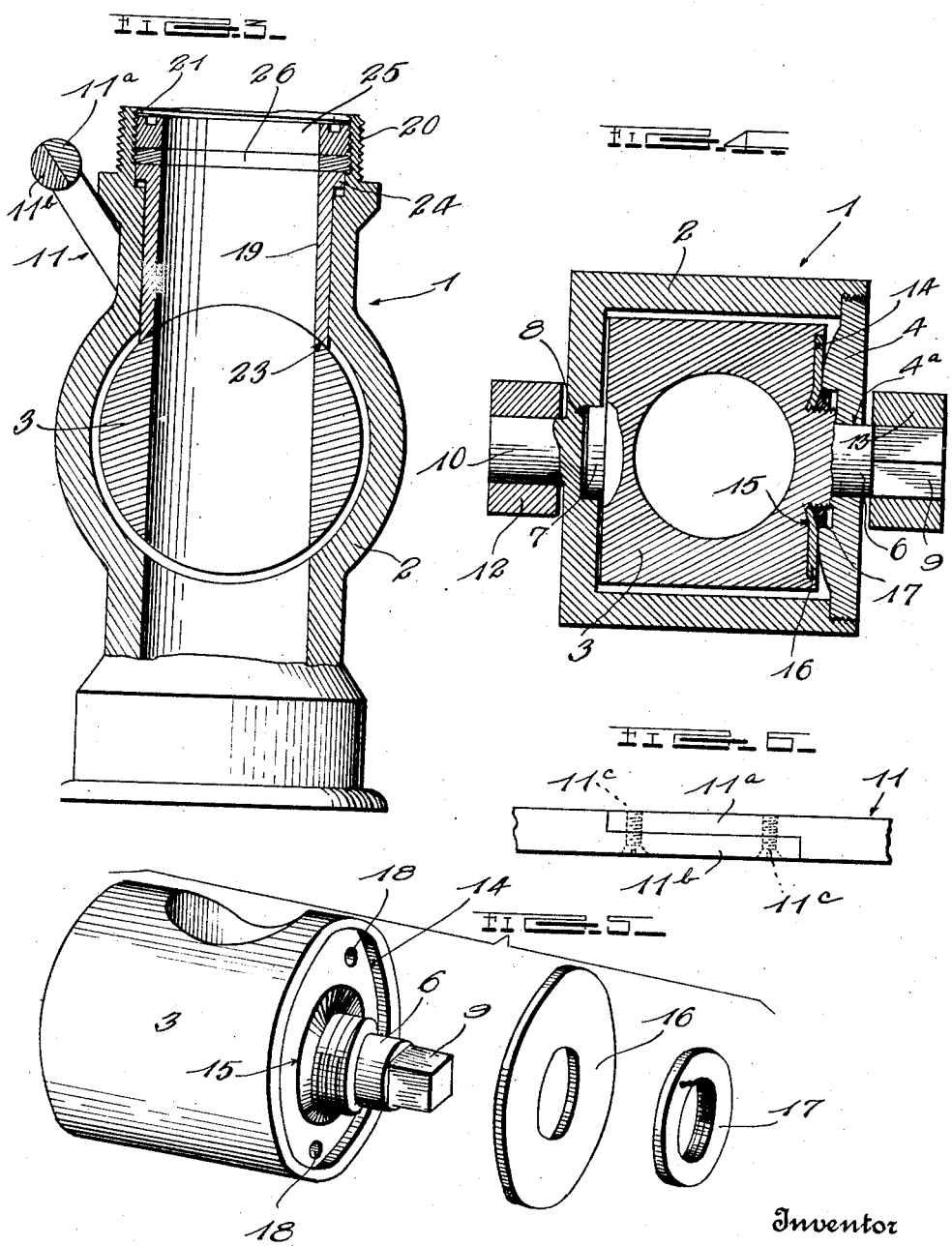

CLARENCE LEELAND HARDY, OF DAYTON, OHIO, ASSIGNOR TO MAURICE D. LARKIN, OF DAYTON, OHIO.

NOZZLE.

1,381,873. Specification of Letters Patent. Patented June 14, 1921.

Application filed October 30, 1919. Serial No. 334,435.

*To all whom it may concern:*

Be it known that I, CLARENCE L. HARDY, a citizen of the United States, residing at Dayton, in the county of Montgomery and State of Ohio, have invented certain new and useful Improvements in Nozzles; and I do declare the following to be a full, clear, and exact description of the invention, such as will enable others skilled in the art to which it appertains to make and use the same.

This invention relates to improvements in hose nozzles, and it has more particular reference to a fire hose nozzle such as used in connection with fire engines; although it is not to be restricted to such use.

The principal object of the invention is to provide a nozzle of the above mentioned type in which the construction is such that friction between the working parts is greatly reduced, thereby preventing excessive wear between the parts and prolonging the life of the valve.

Another object of the invention is to provide a nozzle which includes an adjustable valve seat, that is, one which is so constructed and arranged that any wear between itself and the valve may be readily taken up.

A further object of the invention is to provide a nozzle of the above mentioned character which is simple in construction, highly effective and efficient in use, strong, durable, and absolutely fluid-tight.

Other objects and advantages of the invention will become apparent during the course of the following description.

In the accompanying drawings forming a part of this specification and in which like numerals are employed to designate like parts throughout the same, Figure 1 is an elevation of a nozzle constructed in accordance with my invention.

Fig. 2 is a central longitudinal sectional view thereof.

Figs. 3 and 4 are sections of the plane of the line 3—3 and 4—4 of Fig. 1.

Fig. 5 is a detail perspective view of the rotary valve, packing ring and packing ring retaining washer.

Fig. 6 is a view illustrating the manner in which the handle is made.

In the drawings, wherein for the purpose of illustration is shown a preferred embodiment of my invention, the numeral 1 designates a valve casing or body showing a longitudinal tapered bore extending therethrough and intersected by a substantially cylindrical valve chamber 2 in which a cylindrical rotary valve or turn-plug 3 is journaled. One of the ends of the valve chamber is open as shown and a cap or other suitable closure 4 which has its inner face beveled is screw threaded therein and serves to to close the valve chamber when the nozzle is in use. This cap 4 is removable as is obvious, and in order to facilitate such removal it is provided in its outer face with spanner recesses 5 so that a suitable wrench may be effectively employed. The rotary valve 3 is provided with a pair of oppositely disposed stub axles or valve stems 6 and 7. The shorter one 7, is seated in a socket 8 in the casing 1 and the longer one 6 extends through a valve stem opening $4^a$ in the cap 4 and outwardly beyond the same. A portion of the last named axle is provided with a flat face portion as indicated at 9 and this axle in conjunction with a similar stub axle 10 serves to support the U-shaped valve actuating handle 11. Stub axle 10 is carried by the body member 1 and is preferably cast integral therewith, it being in axial alinement with the axle 6. The handle 11 includes a pair of eyes 12 and 13 and the eye 12 is rotatable around the axle 10, while the eye 13 is noncircular and coacts with or engages the flat face portion 9 of the shaft 6 thereby permitting the valve 3 to be opened and closed, as is obvious. I desire to make this handle of two parts to permit it to be readily placed in actuating position. To this end it will be seen that each of these sections is substantially L-shaped and their meeting ends $11^a$ and $11^b$ are detachably connected together in overlapping relationship by means of screws $11^c$ (Fig. 6). In addition to the tapered transverse passage which extends through the valve and registers with the longitudinal bore in the casing 1 when the valve is open, the valve is also provided in one of its ends with a packing retaining recess 14, the central portion of which is inwardly beveled as at 15. This recess serves to receive a flexible packing ring 16 therein, which is retained in position by a beveled face packing retaining washer or nut 17, threaded on the axle 6, and adapted to force the central portion of the packing ring 16 tightly into the beveled portion of the valve as shown. In order to insure against leakage, I drill apertures or water passages 18 in the recessed end of the valve 3, and these apertures afford communication between the recess 14 in the valve and transverse passage through the valve; and water under pressure within the valve passes through these openings and forces the packing ring 16 tightly against the beveled inner face of the closure 4, thereby forming a fluid-tight joint between the turn-plug 3, the cap 4 and the valve axle 6.

Constant use, of nozzles of this type, causes great wear between the valve and the casing in which it rotates. To obviate and eliminate this wear, as much as possible, it will be seen that I prefer to make the valve chamber 2 sufficiently large to permit a space to be formed between its inner surface and the periphery of the valve 3. Consequently, friction between these parts will be entirely eliminated and the wear greatly reduced. Inasmuch as a great amount of wear between the valve and its seat would otherwise occur, I employ an adjustable and removable cylindrical valve seat 19 which is fitted in the longitudinal bore of the body member 1. To this end it will be seen that I provide the casing 1 with an externally and internally threaded portion as shown at 20 and 21. A nozzle 22 is threaded onto the externally threaded portion 20. The valve seat 19, has its inner end 23 shaped to bear tightly on the cylindrical surface of the valve 3, and it is provided on its opposite or outer end with an annular flange 24 which is disposed in the enlarged portion of the bore. A ring nut 25 is engageable with the internal threaded part 21 of the bore, and between this nut and the flange 24 is a resilient packing ring 26. Hence, it will be seen that when contacting portions of the valve and valve seat become worn, it will be necessary only to screw the nut 25 inward, thereby moving the parts tightly together and taking up all wear as it occurs. I also wish to point out that by positioning the packing ring 26 between the flange 24 and the nut 25 I greatly reduce friction between the valve and its seat, as this construction permits the valve seat to yield slightly.

It will be seen that all the parts of my valve are easily and readily removed for repairing, etc., and the construction is such that there is a minimum amount of wear between the parts thereof; it is absolutely fluid-tight and the parts are exceedingly simple in construction and comparatively inexpensive to manufacture.

The use and operation of the device is believed to be understood, therefore, further description is deemed unnecessary.

It is to be understood that the form of my invention herein shown and described is to be taken as a preferred form of the same and that various changes in the shape, size, and arrangement of parts may be resorted to without departing from the spirit of the invention or the scope of the subjoined claims.

Having thus described my invention, I claim:—

1. In a hose nozzle, a valve casing having a longitudinal bore extending therethrough, and intersected by a transverse cylindrical valve chamber which is open at one end, a removable cap closing this end of the chamber, the inner face of the cap being convex and there being a central bearing-opening formed therein, a rotary cylindrical valve in said chamber, said valve having a transverse opening for registration with the aforesaid bore and being provided in its end adjacent the cap with a recess, there being a journal extending from this recessed end through the bearing-opening in the cap and there also being a plurality of openings formed in this end of the valve which intersect said recess and permit passage of water therethrough, and a flexible packing ring surrounding said journal and seated in said recess, said ring being forced into tight contact with the convex face of the closing cap by the water which passes through the aforesaid openings and against it.

2. In a hose nozzle, a valve casing having a bore extending therethrough and intersected by a cylindrical valve chamber, the latter having one of its ends open, a removable cap closing said opening, the cap having its inner face beveled and being provided with a valve stem opening, a rotary valve in said chamber, the valve having a transverse passage therethrough adapted to register with the bore when the valve is open and being provided with a valve stem which extends through said valve stem opening, the valve also including water passages and a packing receiving recess, said water passages affording communication between the passage through the valve and the space between the valve and the cap, said recess also including an inwardly beveled portion surrounding the valve stem, a flexible packing disk surrounding said valve stem between the cap and the valve, and a beveled face packing-ring-retaining-nut on said valve stem and normally forcing said packing into the beveled portion of the recess, whereby water under pressure in the valve will pass through the water passages and press the packing ring tightly against the beveled face of the closing cap, thereby forming a fluid-tight joint substantially as set forth.

3. In a hose nozzle, a valve body having a bore extending therethrough which is increased in diameter at its outer end, thus forming an internal shoulder, said bore being intersected by a valve chamber, a valve in the chamber, the inner wall of the enlarged portion of said bore being internally screw-threaded, a cylindrical valve seat member slidable in the smaller portion of said bore, the outer end of said member being provided with a lateral flange disposed in the enlarged portion of the bore and normally spaced from said shoulder, an expansible ring bearing on said flange, a ring nut threaded into the internally screw-threaded portion of the bore and bearing against said expansible ring, the latter and ring nut having an internal diameter the same as that of said seat member.

4. In a hose nozzle, a valve casing having a bore extending therethrough, a rotary valve in said casing, the valve being provided with a cylindrical valve stem extending through said valve casing and projecting beyond one side of the same, the valve stem having a flat face portion, a second axially alined stub axle carried by said casing and projecting outwardly therefrom, a substantially U-shaped handle having eyes at its free ends, one of said eyes being designed to engage the flat-faced portion of the first named valve axle, the other eye being circular and rotatable around said second named axle, said handle being composed of two substantially L-shaped sections having their ends connected in overlapping relationship, and means for detachably securing the sections of the handle together, substantially as set forth.

In testimony whereof I have hereunto set my hand.

CLARENCE LEELAND HARDY.